(12) United States Patent
Walker

(10) Patent No.: US 7,509,744 B2
(45) Date of Patent: Mar. 31, 2009

(54) MODE SELECTION MECHANISM FOR POWER TOOL AND POWER TOOL INCORPORATING SUCH MECHANISM

(75) Inventor: Andrew Walker, Durham (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/837,624

(22) Filed: Aug. 13, 2007

(65) Prior Publication Data

US 2007/0289149 A1      Dec. 20, 2007

Related U.S. Application Data

(63) Continuation of application No. 10/902,750, filed on Jul. 29, 2004, now abandoned.

(30) Foreign Application Priority Data

May 18, 2004   (EP)   .................................. 04252931

(51) Int. Cl.
      *B26B 19/00*   (2006.01)
(52) U.S. Cl. .......................................... 30/393; 30/392
(58) Field of Classification Search ................... 30/392, 30/393, 394; 83/747
      See application file for complete search history.

(56) References Cited

U.S. PATENT DOCUMENTS

| | | | | |
|---|---|---|---|---|
| 2,775,272 | A | * | 12/1956 | Papworth ...................... 30/393 |
| 3,494,371 | A | | 2/1970 | Thiry |
| 3,542,097 | A | * | 11/1970 | Dudek et al. ................... 30/392 |
| 3,665,983 | A | | 5/1972 | Wagner et al. |
| 3,729,822 | A | | 5/1973 | Batson |
| 4,021,914 | A | | 5/1977 | Leibundgut et al. |
| 4,238,884 | A | * | 12/1980 | Walton, II ..................... 30/393 |
| 4,262,420 | A | | 4/1981 | Nalley |
| 4,262,421 | A | * | 4/1981 | Bergler et al. ................. 30/393 |
| 4,283,855 | A | | 8/1981 | Nalley |
| 4,351,112 | A | * | 9/1982 | Nalley ......................... 30/392 |

(Continued)

FOREIGN PATENT DOCUMENTS

DE      87 02 727 U      4/1987

(Continued)

*Primary Examiner*—Kenneth E. Peterson
*Assistant Examiner*—Sean Michalski
(74) *Attorney, Agent, or Firm*—Harness, Dickey & Pierce, P.L.C.

(57) ABSTRACT

A mode selection apparatus for a jigsaw having scrolling and orbital modes is disclosed. The mode selection apparatus comprises a locking arm (76) moveable between a first position in which a scroller knob (56) is rotatable relative to the tool housing, a second position in which the locking arm engages the scroller knob to prevent it from rotating relative to the tool housing and an output shaft of the jigsaw is prevented from pivoting about a pivot axis transverse to the longitudinal axis of the output shaft, and a third position in which the scroller knob is prevented from rotating relative to the tool housing and the output shaft is causes to pivot about the pivot axis. The locking arm (76) has a slot (84) for engaging a tooth (86) on a scroll selector (48) for moving the locking arm between the first, second and third positions thereof. The tooth (86) remains in engagement with the slot (84) during movement of the locking arm between the first, second and third positions.

14 Claims, 12 Drawing Sheets

U.S. PATENT DOCUMENTS

| | | | |
|---|---|---|---|
| 4,545,123 A * | 10/1985 | Hartmann | 30/393 |
| 4,693,009 A * | 9/1987 | Bone | 30/392 |
| 5,170,564 A | 12/1992 | Kaiser | |
| 5,765,463 A | 6/1998 | Okubo et al. | |
| 5,988,034 A | 11/1999 | Okubo et al. | |
| 6,625,892 B2 * | 9/2003 | Takahashi et al. | 30/393 |
| 7,328,514 B2 * | 2/2008 | Park | 30/393 |
| 2005/0257383 A1 * | 11/2005 | Million | 30/392 |
| 2005/0257384 A1 * | 11/2005 | Million | 30/392 |
| 2005/0257385 A1 * | 11/2005 | Walker | 30/392 |
| 2006/0288592 A1 * | 12/2006 | Roberts | 30/392 |
| 2007/0180711 A1 * | 8/2007 | Park | 30/393 |

FOREIGN PATENT DOCUMENTS

| | | |
|---|---|---|
| DE | 37 02 670 A | 8/1988 |
| EP | 0 158 325 A | 10/1985 |

* cited by examiner

MODE SELECTION MECHANISM FOR POWER TOOL AND POWER TOOL INCORPORATING SUCH MECHANISM

FIELD OF THE INVENTION

The present invention relates to a mode selection mechanism for a power tool, and relates particularly, but not exclusively, to a mode selection mechanism for preventing simultaneous actuation of a scrolling mode of a jigsaw (i.e. in which an output shaft supporting a jigsaw blade can rotate about its longitudinal axis relative to the jigsaw housing) and an orbital mode of a jigsaw (i.e. in which the output shaft is pivotable relative to the housing about an axis transverse to its longitudinal axis, so that an oscillating motion is superimposed on the axial reciprocating motion of the jigsaw blade). The invention also relates to a power tool incorporating such a mode selection mechanism.

BACKGROUND OF THE INVENTION

EP0158325 discloses a jigsaw having (i) a scrolling mode in which an output shaft and jigsaw blade can rotate about a longitudinal axis of the output shaft to enable cutting of smaller radii of curvature or more intricate types of cut than conventional jigsaws in which the jigsaw blade only faces forwards, and (ii) an orbital mode in which the output shaft oscillates about a pivot in a fore and aft direction to assist the cutting action of the jigsaw blade.

In jigsaws having a scrolling mode and an orbital mode, it is desirable to prevent simultaneous actuation of the scrolling and orbital modes, since the jigsaw is difficult to operate when in the orbital mode when the jigsaw blade is not oriented forwards relative to the jigsaw housing. In the jigsaw of EP0158325, this is carried out by means of a mode selection mechanism in which a mode selector is provided with a pinion and a cam surface, such that in an orbital mode, the pinion moves a rack into engagement with a scroller knob to prevent rotation of the scroller knob relative to the housing, while in the scrolling mode, the cam surface prevents pivoting movement of the output shaft of the jigsaw about its pendulum axis. However, this known arrangement suffers from the drawback that the rack and pinion mechanism is of complicated construction and relatively difficult to assemble, which significantly increases the cost of production of a jigsaw incorporating this mechanism.

Another jigsaw having scrolling and orbital modes is disclosed in DEU8702727.5. In this jigsaw, a mode selection knob moves a carriage between an upper position in the orbital mode, in which rotation of an output shaft of the jigsaw about its longitudinal axis is prevented, and a lower position in the scrolling mode, in which pivoting of the output shaft about an axis transverse to its longitudinal axis is prevented. However, this jigsaw suffers from the disadvantage that the carriage cannot be used to simultaneously disable the scrolling and orbital modes, as a result of which a further actuator mechanism is required. This in turn has the disadvantage of increasing the cost of production of the jigsaw and making the jigsaw less easy to use.

Preferred embodiments of the present invention seek to overcome the above disadvantages of the prior art.

BRIEF SUMMARY OF THE INVENTION

According to an aspect of the present invention, there is provided a mode selection apparatus for a power tool having a tool housing, a motor arranged in the tool housing, and an output shaft adapted to be driven in a reciprocating motion relative to the tool housing by means of the motor and to support a working member of the tool for reciprocating motion of the working member relative to the tool housing, the mode selection apparatus comprising:

at least one locking member moveable between a respective first position in which an output shaft of the tool is pivotable about its longitudinal axis, a respective second position in which the output shaft is prevented from pivoting about its longitudinal axis and is prevented from engaging a drive mechanism to prevent the output shaft from pivoting about a pivot axis transverse to said longitudinal axis, and a respective third position in which the output shaft is prevented from pivoting about its longitudinal axis and engages said drive mechanism to cause the output shaft to pivot about the pivot axis transverse to said longitudinal axis, wherein said locking member has at least one respective first protrusion and/or recess; and at least one mode selection member for engaging a respective said locking member for moving the locking member between first, second and third positions thereof and having at least one second protrusion and/or recess for engaging a respective said first recess and/or protrusion on said locking member;

wherein at least one said protrusion and/or recess of a said mode selection member is adapted to remain in engagement with the corresponding said recess and/or protrusion of a said locking member during movement of said locking member between said first, second and third positions thereof.

By providing at least one protrusion and/or recess of a mode selection member which is adapted to remain in engagement with the corresponding recess and/or protrusion of a locking member during movement of the locking member between its first, second and third positions, this provides the advantage of making the mode selection apparatus of more simple construction and easier to assemble than a mechanism employing a rack and pinion, which significantly reduces the cost of production of a tool incorporating the apparatus. In addition, by providing at least one mode selection member for moving a respective locking member between the first, second and third positions thereof, this provides the advantage of enabling three modes of a tool incorporating the mode selection apparatus, for example scrolling mode, orbital mode and conventional mode of a jigsaw, to be selected by means of a single actuator, which in turn makes the tool more convenient to operate.

At least one said locking member may be adapted to engage a first actuator member on said tool housing in said first and second positions to prevent rotation of said first actuator member relative to the tool housing.

At least one said locking member may be adapted to engage at least one respective slot and/or protrusion on the first actuator member.

At least one said mode selection member may have at least one respective cam surface for causing the output shaft to move out of engagement with the drive mechanism to prevent the output shaft from pivoting about the pivot axis transverse to said longitudinal axis.

At least said one cam surface may be a groove.

At least one said cam surface may be a protrusion.

At least one said mode selection member may be adapted to rotate relative to the tool housing.

The apparatus may further comprise at least one first actuator member for enabling rotation of the output shaft about said longitudinal axis.

The apparatus may further comprise at least one second actuator member for actuating at least one said mode selection member for moving at least one said locking member between first, second and third positions thereof.

According to another aspect of the present invention, there is provided a power tool having a tool housing, a motor arranged in the tool housing, an output shaft adapted to be driven in a reciprocating motion relative to the tool housing by means of the motor and to support a working member of the tool for reciprocating motion of the working member relative to the tool housing, and a mode selection apparatus as defined above.

The power tool may be a jigsaw.

BRIEF DESCRIPTION OF THE DRAWINGS

Preferred embodiments of the invention will now be described, by way of example only and not in any limitative sense, with reference to the accompanying drawings, in which.

DETAILED DESCRIPTION OF THE INVENTION

Figure 1:
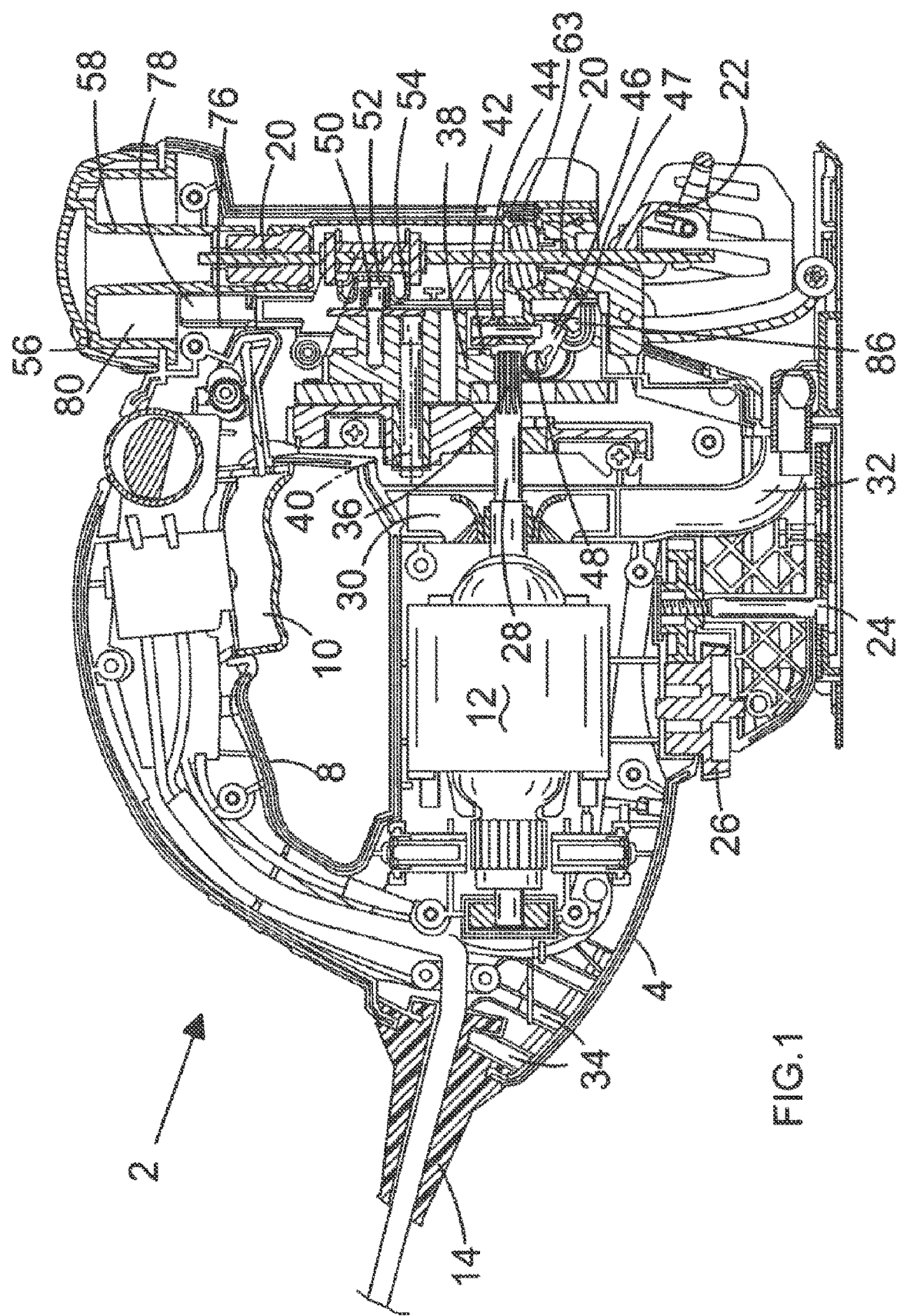
FIG. 1 is a cross-sectional elevation view of a jigsaw embodying the present invention.

Referring to FIG. 1, a jigsaw 2 has a housing 4 comprising two clam shell halves 6 (only one of which is shown in FIG. 1) defining a handle 8 having a trigger switch 10 for operating a motor 12 supplied with electrical power via a cable 14. A shoe 16 for resting on a workpiece (not shown) is located at a lower part of the housing 4, and a jigsaw blade 18 (FIG. 2) is attached to the lower end of an output shaft 20 by means of a blade clamp mechanism 22. The operation of the blade clamp mechanism 22 is not relevant to an understanding of the present invention and will therefore not be described in greater detail herein. The orientation of the shoe 16 is adjustable relative to the housing 4 to enable bevel cutting, and can be fixed by means of a clamping screw 24 operated by a locking mechanism 26, which is also not relevant to an understanding of the present invention and will therefore not be described in greater detail.

The motor 12 drives a shaft 28 which carries a fan 30. When the fan 30 rotates, air is expelled via duct 32 and may be used to blow sawdust away from the vicinity of blade 18, and draws air through inlets 34 in housing 4 to cool motor 12. The shaft 28 carries a pinion 36 which meshes with a drive gear 38 mounted about axis 40, the gear 38 carrying a cam surface 42 on its front face. A cam follower 44 is selectively engageable with cam surface 42 by means of cam portion 46 of scroll selector 48 to operate an orbital mode of the jigsaw in a manner which will be described in greater detail below. The gear 38 also carries an eccentric pin 50 which slidably fits in a slot 52 of scotch yoke mechanism 54 mounted to output shaft 20.

Figure 2:
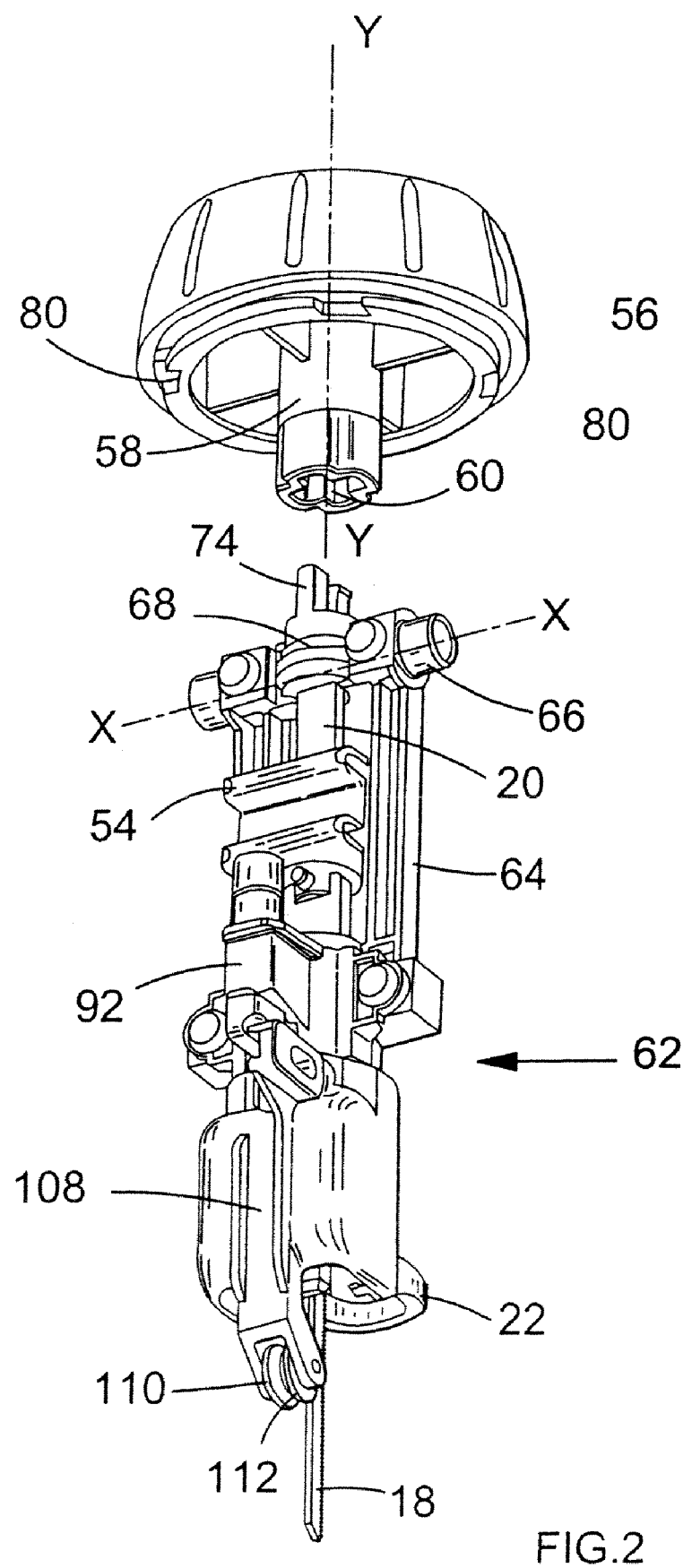
FIG. 2 is a perspective view of a blade support assembly, jigsaw blade and scrolling knob of the jigsaw of FIG. 1.
Figure 3A:
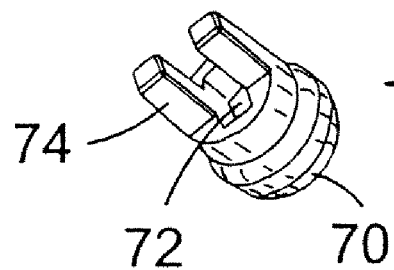
FIG. 3 (a) is a perspective view of an upper bearing of the blade support assembly of FIG. 2.
FIG. 3(b) is a front view of the upper bearing of FIG. 3(a)
FIG. 3(c) is a top view of the upper bearing of FIG. 3(a)
FIG. 3(d) is a side view of the upper bearing of FIG. 3(a)
FIG. 3(e) is a bottom view of the upper bearing of FIG. 3(a)
FIG. 3(f) is a side cross sectional view of the upper bearing of FIG. 3(a)
Figure 3B:
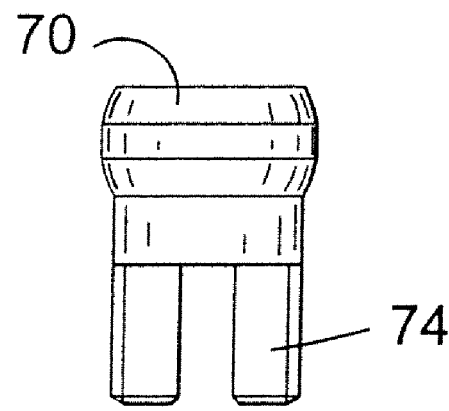
Figure 3C:
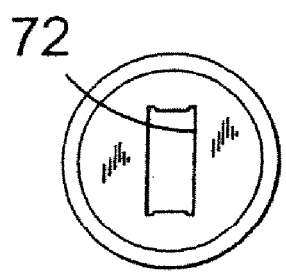
Figure 3D:
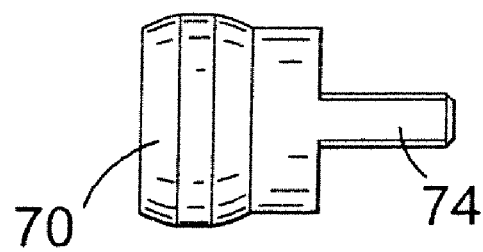
Figure 3E:
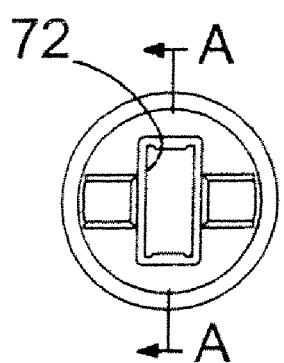
Figure 3F:
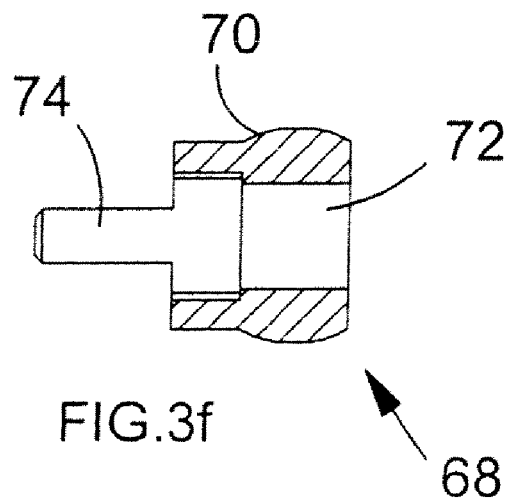

Referring now to FIG. 2, a scroller knob 56 is rotatably mounted to the housing 4 for adjusting the orientation of the blade 18 relative to the housing 4. The scroller knob 56 has a collar portion 58 having a cruciform bore 60 therein, the purpose of which is described in greater detail below. A blade support assembly 62 has a support housing 64 having trunnions 66 which are received in corresponding recesses (not shown) in housing 4 to enable the assembly 62 to pivot about axis X-X relative to the housing 4 in the orbital mode of the jigsaw. An upper bearing 68 (FIG. 3) has a partially spherical portion 70 which is rotatable about axis Y-Y relative to support housing 64, and has a slot 72 therethrough for receiving the output shaft 20 such that the output shaft 20 can slide in the direction of axis Y-Y relative to the upper bearing 68, but is prevented from moving relative to the bearing 68 in a direction transverse to the axis Y-Y. The upper bearing 68 also has a pair of legs 74 which are received in cruciform bore 60 of scroller knob 56 such that the bearing 68 (and therefore the output shaft 20) rotates with the scroller knob 56 about axis Y-Y, but limited pivoting movement of the bearing 68 about axis X-X relative to the scroller knob 56 is permitted.

Figure 4:
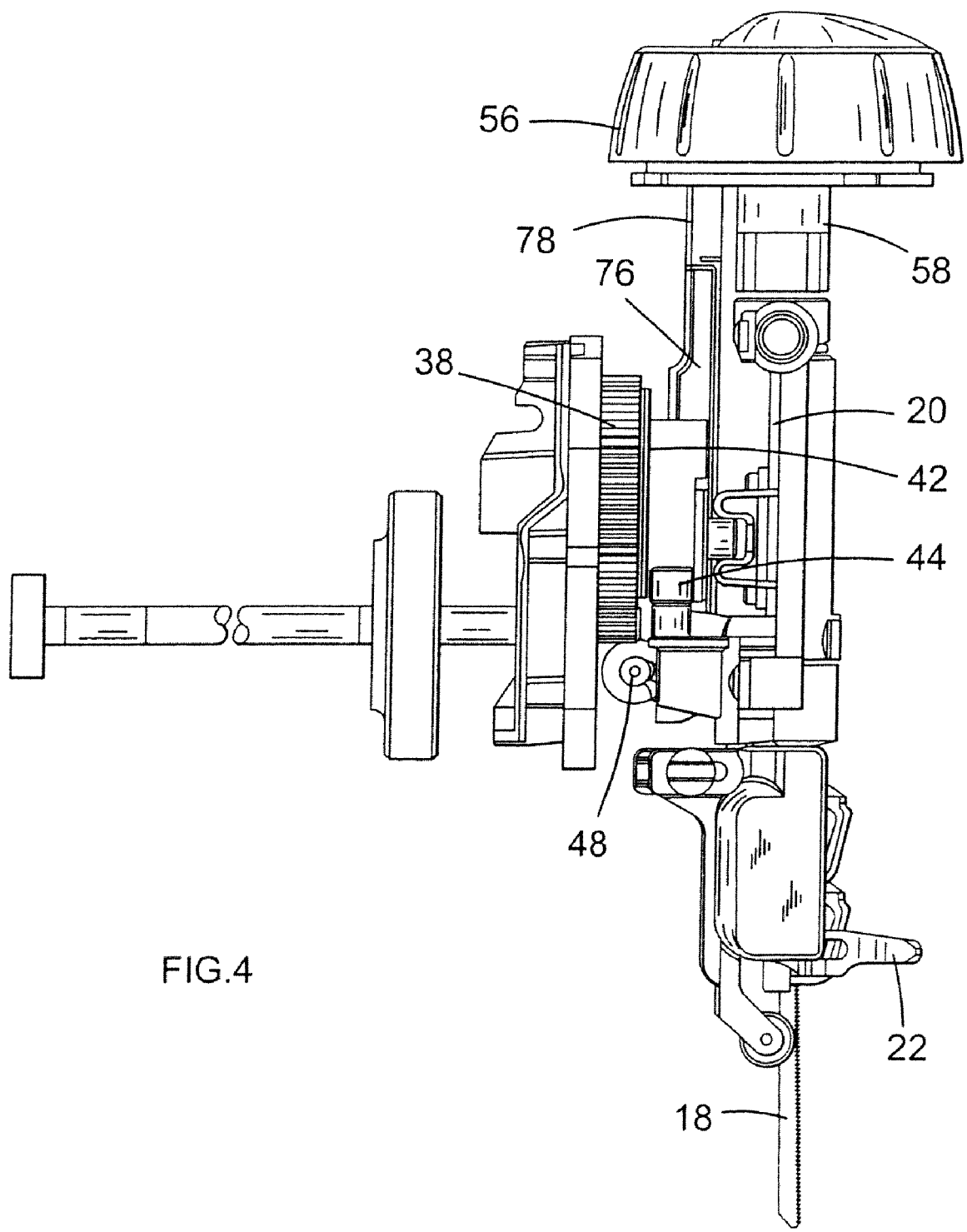
FIG. 4 is a side view of the blade support assembly, jigsaw blade and scrolling knob of FIG. 2, together with a drive mechanism of the jigsaw of FIG. 1, but having an alternative embodiment of scroll selector to the arrangement shown in FIG. 1.
Figure 5C:
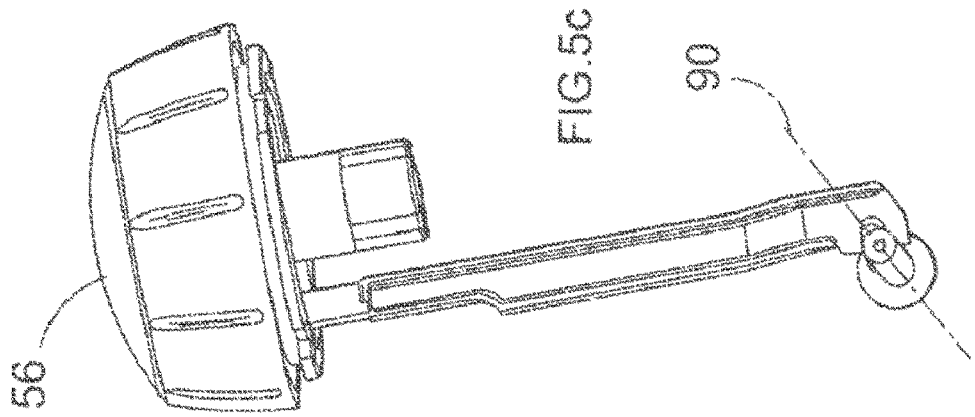
FIG. 5(c) is a perspective view, corresponding to FIG. 5(a) of the scroller knob and scroller locking mechanism in an orbital mode of the jigsaw.
Figure 5B:
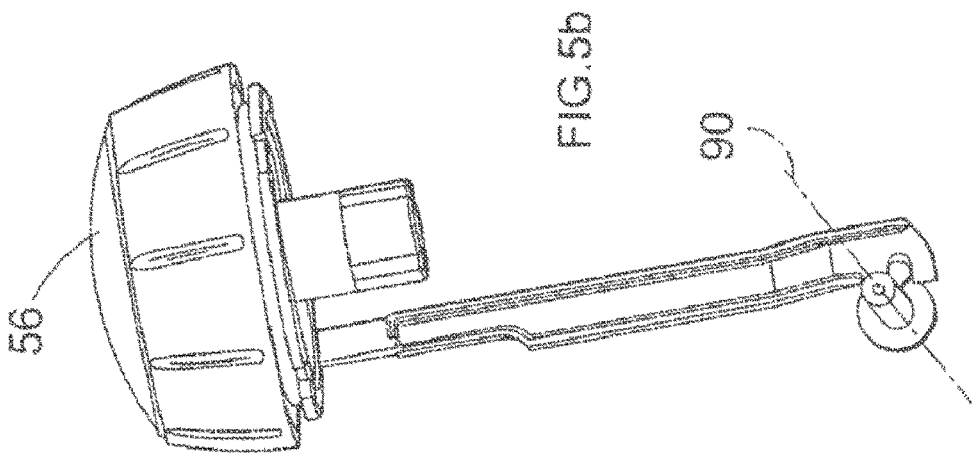
FIG. 5(b) is a perspective view, corresponding to FIG. 5(a) of the scroller knob and scroller locking mechanism in a conventional mode of the jigsaw.
Figure 5A:
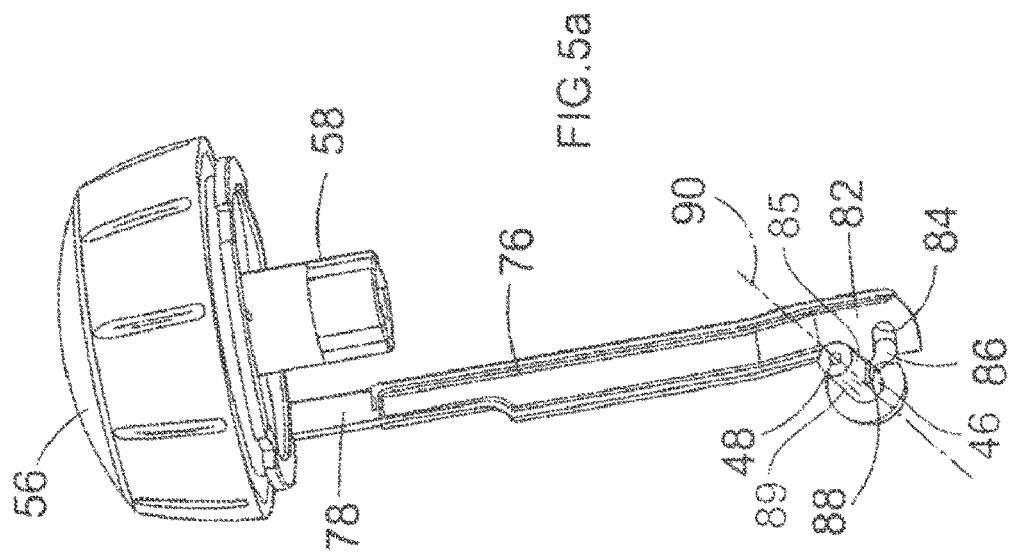
FIG. 5(a) is a perspective view of the scroller knob and scroller locking mechanism of FIG. 4 in a scrolling mode of the jigsaw.

A mechanism for selecting between the scrolling, orbital and conventional modes of the jigsaw is shown in detail with reference to FIGS. 4 and 5. A locking arm 76 is slidably mounted to the housing 4 and is moveable between a lower position, as shown in FIG. 5(a) in which the scroller knob 56 can rotate relative to the housing 4, and two upper positions shown in FIGS. 5(b) and 5(c) in which an upper end 78 of the locking arm 76 is received in one or more slots 80 in the underside of scroller knob 56 to prevent rotation of the scroller knob 56 about axis Y-Y relative to the housing 4. The scroll selector 48 is rotatably mounted to the housing 4 and can be rotated by means of a mode selector knob (not shown) on the housing 4, and a lower end 82 of locking arm 76 has a rounded groove 84 which receives a rounded tooth 86 provided on scroll selector 48 such that rotation of scroll selector 48 relative to the housing 4 causes movement of the locking arm 76 parallel to the axis Y-Y. The cam portion 46 of the scroll selector 48 is a protrusion 47 that rotates with the scroll selector 48 in the embodiment of FIG. 1 and a groove 88 formed in the outer periphery 85 of the a post 89 of the scroll selector 48 in the embodiment of FIGS. 5(a) to 5(c).

Referring now to FIGS. 5(a) to 5(c), in the position shown in FIG. 5(a), the rotational position of scroll selector 48 about axis 90 relative to the housing 4 is such that the upper end 78 of locking arm 76 is not receiving in any of the slots 80 in scroller knob 56, as a result of which the scroller knob 56 (and therefore also the output shaft 20 and jigsaw blade 18) can rotate about axis Y-Y relative to the housing 4 to permit scrolling motion of the blade 18. At the same time, it is desirable to prevent orbital motion of the blade 18 when the jigsaw is in the scroller mode, since it is difficult to operate the jigsaw in the orbital mode when the orientation of the blade 18 relative to the housing 4 is not forwards. This is achieved in the position shown in FIG. 5(a) because the lower end 82 of locking arm 76 is not received within the groove 88, as a result of which the locking arm 76 is urged forwards relative to the scroll selector 48. This in turn abuts lower portion 92 (FIG. 2) of support housing 64, which causes the support assembly 62 to pivot forwards against the action of a spring 63 (FIG. 1) about axis X-X so that cam follower 44 is held out of engagement with cam face 42 on gear 38. As a result, pendulum motion cannot be imparted to the support assembly 62 as the gear 38 rotates.

As the scroll selector 48 is rotated anticlockwise about axis 90 to the position shown in FIG. 5(b), engagement of tooth 86 with rounded groove 84 causes the locking arm 76 to move upwards so that its upper end 78 is received in a slot 80 in scrolling knob 56 to prevent rotation of the scrolling knob 56 relative to the housing 4. At the same time, the lower end 82 of the locking arm 76 is still not received in the groove 88, as a result of which the cam follower 44 is still held out of engagement with the cam surface 42 on gear 38, so pendulum action cannot be imparted to the support assembly 62.

As the scroll selector 48 is further rotated anticlockwise about axis 90 to the position shown in FIG. 5(c), the upper end 78 of locking arm 76 is received further in one of the slots 80, but the lower end 82 of locking arm 76 is now received in the groove 88 on scroll selector 48. As a result, the support assembly 62 and locking arm 76 can pivot under the action of the spring (not shown) to bring the cam follower 44 into engagement with cam surface 42 on gear 38, so that pendulum action is imparted to the support assembly 62 as the gear 38 is rotated by motor 12. It can therefore be seen that the scrolling mode is not permitted when the orbital mode is active, and vice versa. By operating the locking arm 76 by means of the engagement of a tooth 86 in the rounded groove 84 (as opposed to cooperating rack and pinion), this provides the advantage of significantly simplifying manufacture and assembly of the scroll locking mechanism, which in turn reduces the cost of production of the jigsaw.

Figure 6A:
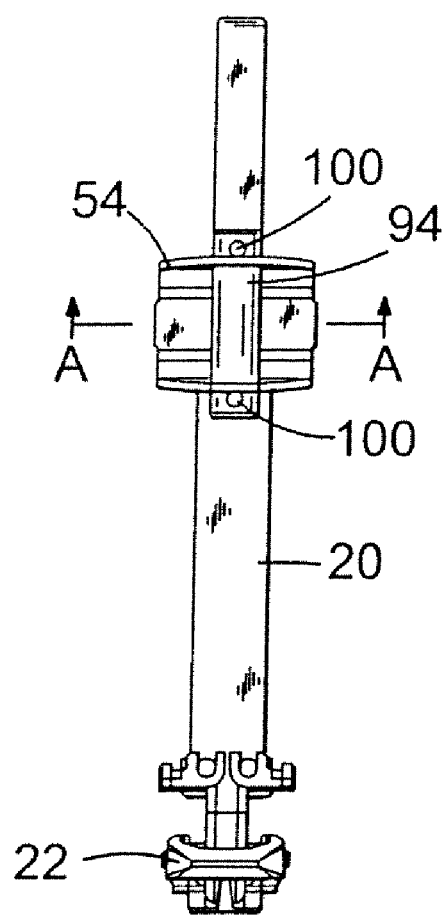
FIG. 6(a) is a front view of a scotch yoke, output shaft and blade clamp of the blade support assembly of FIG. 2.
Figure 6B:
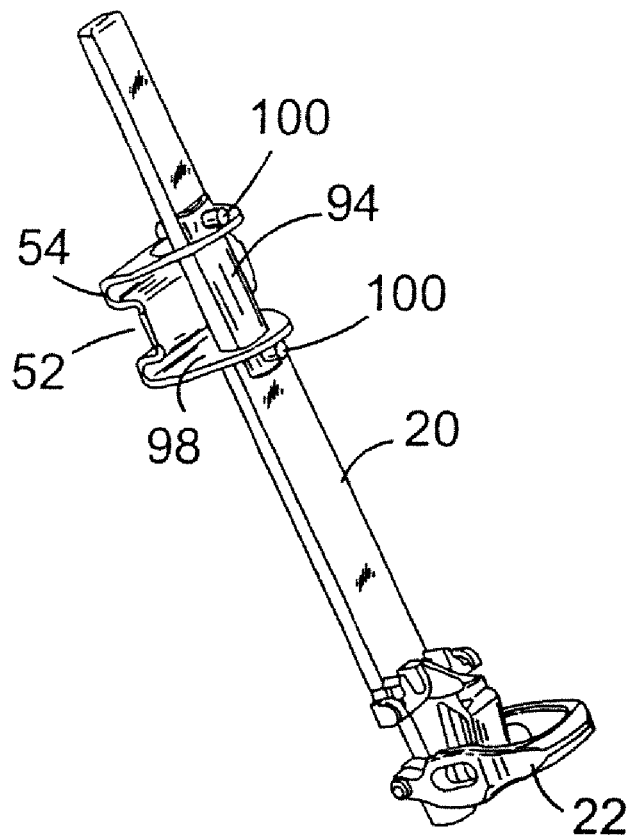
FIG. 6(b) is a perspective view of the scotch yoke, output shaft and blade clamp of FIG. 6(a)
Figure 6C:
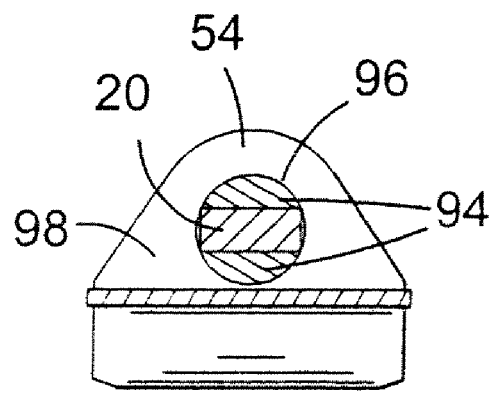
FIG. 6(c) is a top view of the scotch yoke of FIGS. 6(a) and 6(b)
Figure 7:
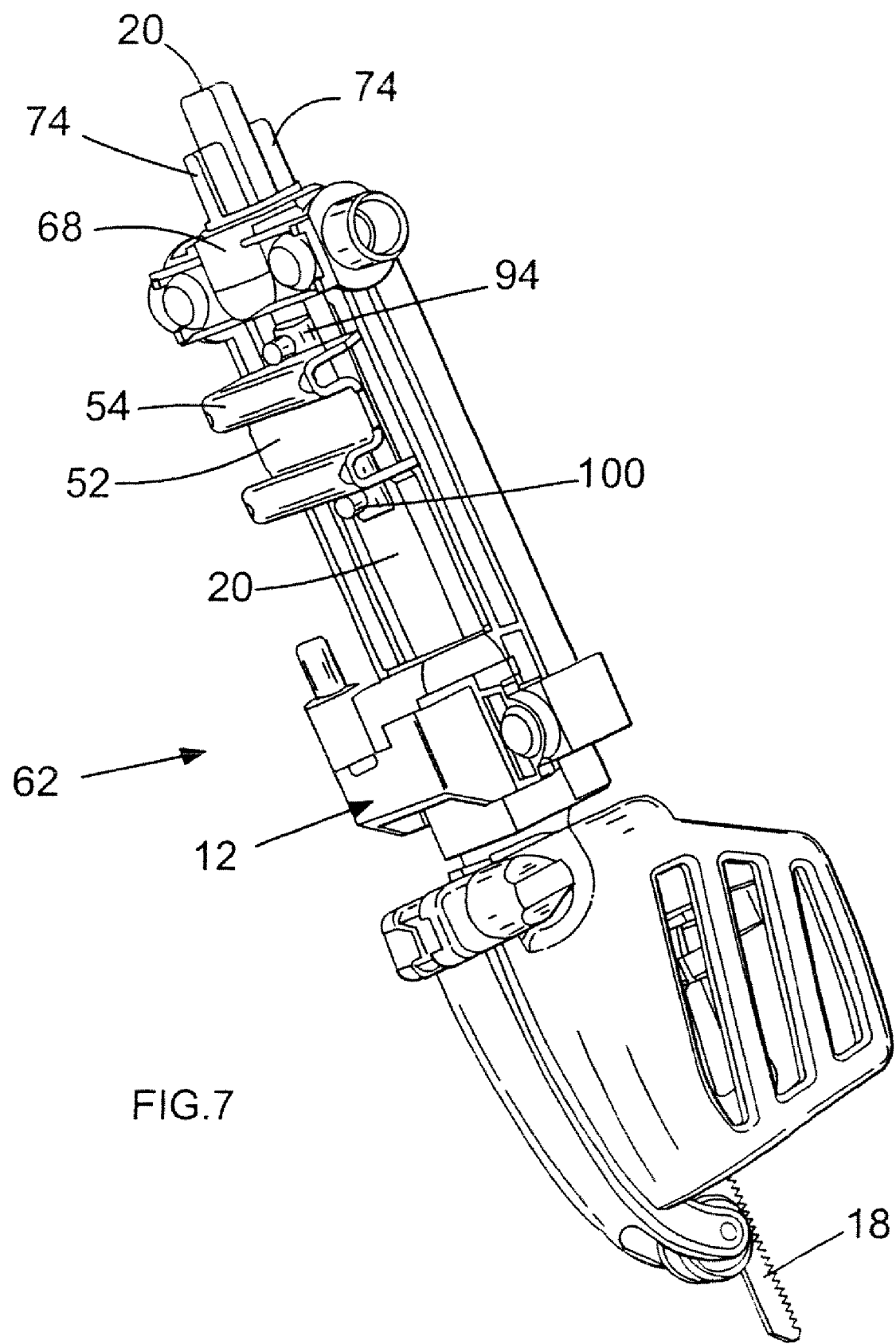
FIG. 7 is a perspective view of the blade support assembly of FIG. 2.
Figure 8:
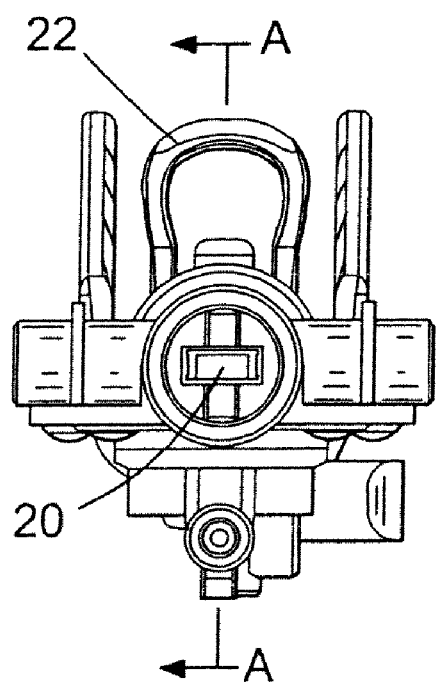
FIG. 8 is a top view of the blade support assembly of FIG. 7.
Figure 9:
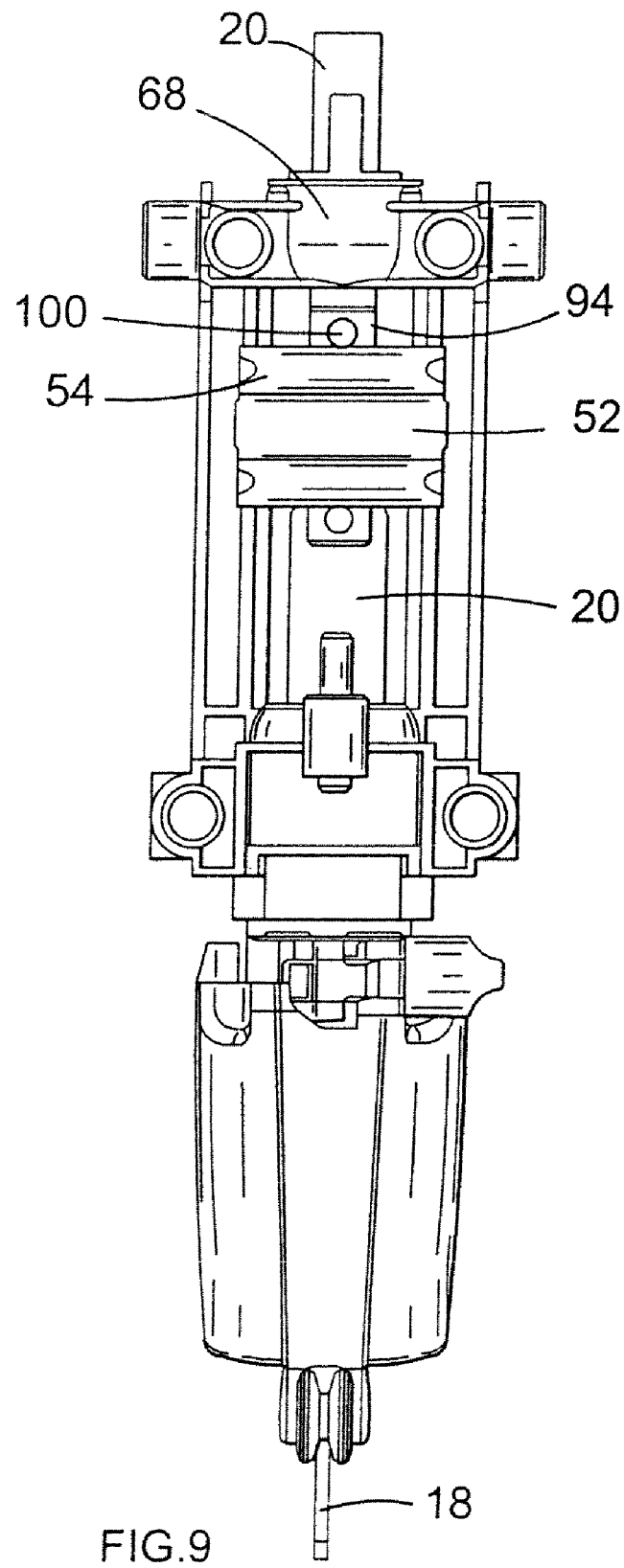
FIG. 9 is a rear view of the blade support assembly of FIG. 7.
Figure 10:
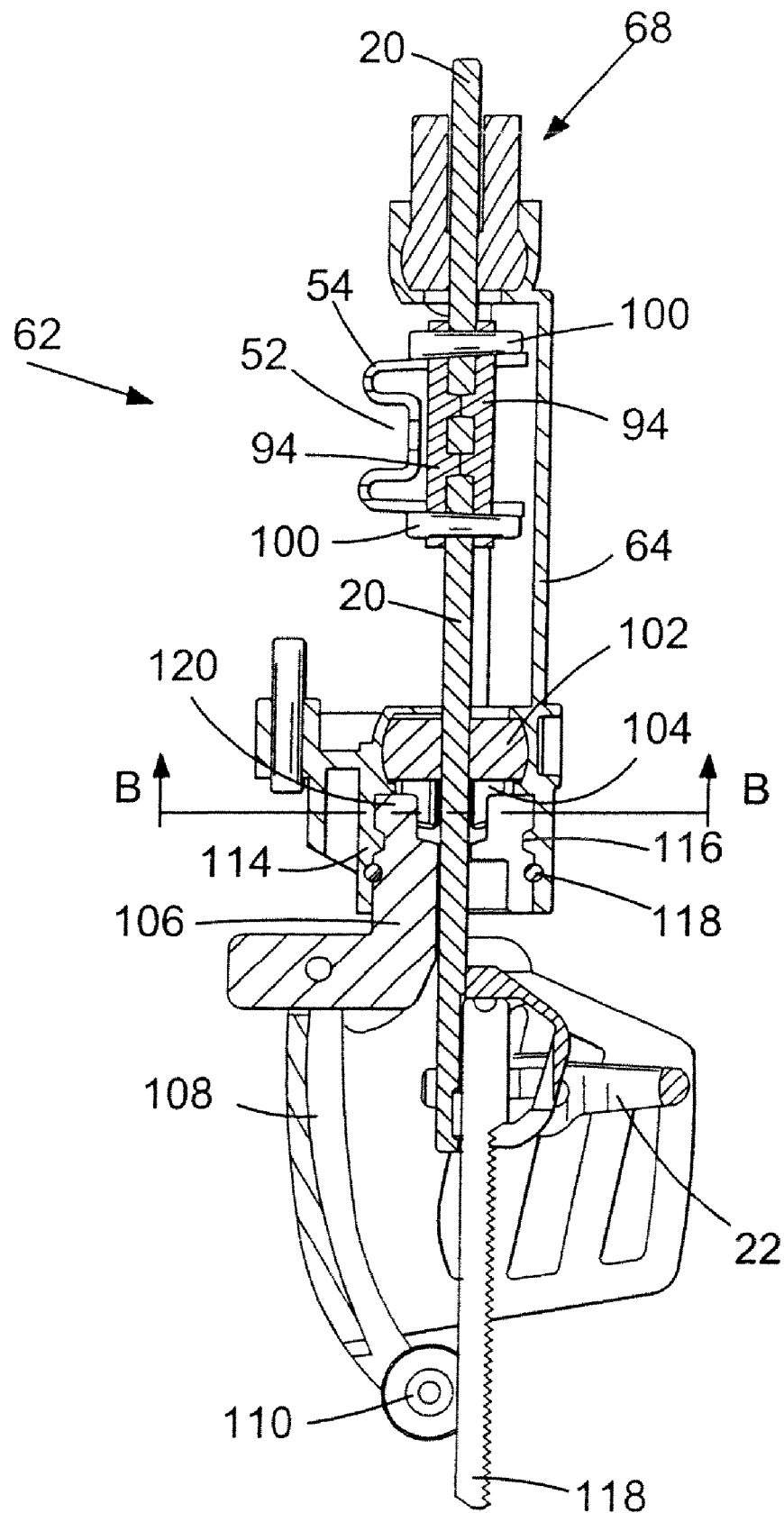
FIG. 10 is a side cross sectional view along the line A-A in FIG. 8.
Figure 11:
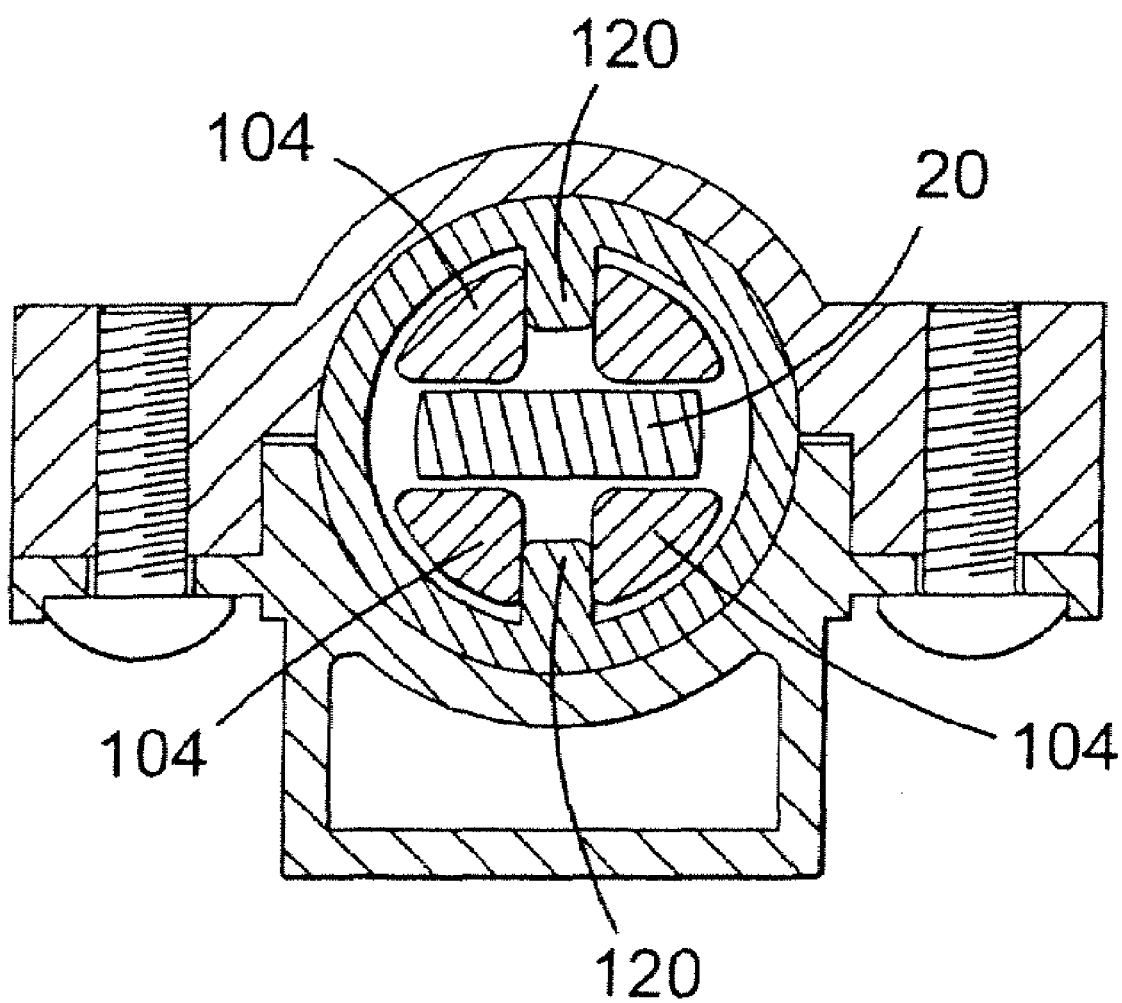
FIG. 11 is a view along the line B-B in FIG. 10.

Referring now to FIGS. 6(a) to 6(c), the output shaft 20 is of rectangular cross section along most of its length. This provides the advantage that the ends of the shaft 20 can be non-rotatably mounted to adjacent parts without the need to provide cross pins (which would be necessary in the case of a shaft of circular cross section) through the shaft which would need to fit into slots at least as deep as the distance of travel of the cross pins during reciprocating motion of the shaft 20. As a result, the parts of the jigsaw at the ends of the shaft 20 can be made of significantly more compact construction than is the case with a shaft of circular cross section.

In order to enable rotation of the shaft 20 relative to the scotch yoke 54 in scrolling mode of the jigsaw, a pair of generally D-shaped inserts 94 are mounted on opposite sides of the shaft 20 to provide that part of the shaft with a partially circular external cross section, and the scotch yoke 54 is rotatably mounted to the shaft 20 by means of circular apertures 96 in upper and lower flanges 98 of the scotch yoke 54. The scotch yoke 54 is then fixed to the shaft 20 by means of pins 100 through D-shaped inserts 94 and shaft 20 so that the scotch yoke 54 cannot move axially relative to the shaft 20, but can pivot about relative to the shaft so that the slot 52 of scotch yoke 54 continues to face eccentric pin 50 (FIG. 1) regardless of the orientation of the blade 18 relative to the housing 4. This enables the blade 18 to be driven in a reciprocating manner when the jigsaw is in the scroller mode.

The support assembly 62 of FIG. 2 is shown in detail in FIGS. 7 to 13. A lower bearing 102 is rotatably mounted about the longitudinal axis of the output shaft 20 to the support housing 64 and has a slot, similar to the slot 72 in upper bearing 68, for slidably receiving the shaft 20 so that the shaft can execute reciprocating axial movement relative to the bearings 68, 102, but is prevented from moving in a direction transverse to its longitudinal axis. The lower bearing 102 has four protruding legs 104 at its lower end, so that a cruciform slot (FIG. 11) is defined between the legs 104 for receiving the shaft 20 and for cooperating with ribs 120 provided on a control bearing 106 such that the control bearing 106 rotates with the lower bearing 102 and output shaft 20 as the output shaft rotates about its longitudinal axis. The control bearing 106 is rotatably mounted to support housing 64 by means of engagement of a flange 116 on support housing 64 with a groove in control bearing 106.

The control bearing 106 has a support arm 108 which carries a blade support roller 110 at a distal end thereof. The blade support roller 110 has a groove 112 (FIG. 1) for receiving the rear face of jigsaw blade 18. Because the control bearing 106 is rotatably mounted to support housing 64, the blade support roller 110 remains in contact with the jigsaw blade 18 in the scrolling, orbital and conventional modes of the jigsaw. The lower bearing 102, control bearing 106 and support housing 64 are so dimensioned that limited pivoting of control bearing 106 relative to lower bearing 102 is possible about an axis transverse to the longitudinal axis of the shaft 20, and limited movement of the control bearing 106 relative to the support housing 64 is possible, with movement due to clearance 122 between control bearing 106 and support housing 64 being taken up by an elastomeric seal 118, which also prevents leakage of lubricant from the interior of the support assembly 62.

Figure 12:
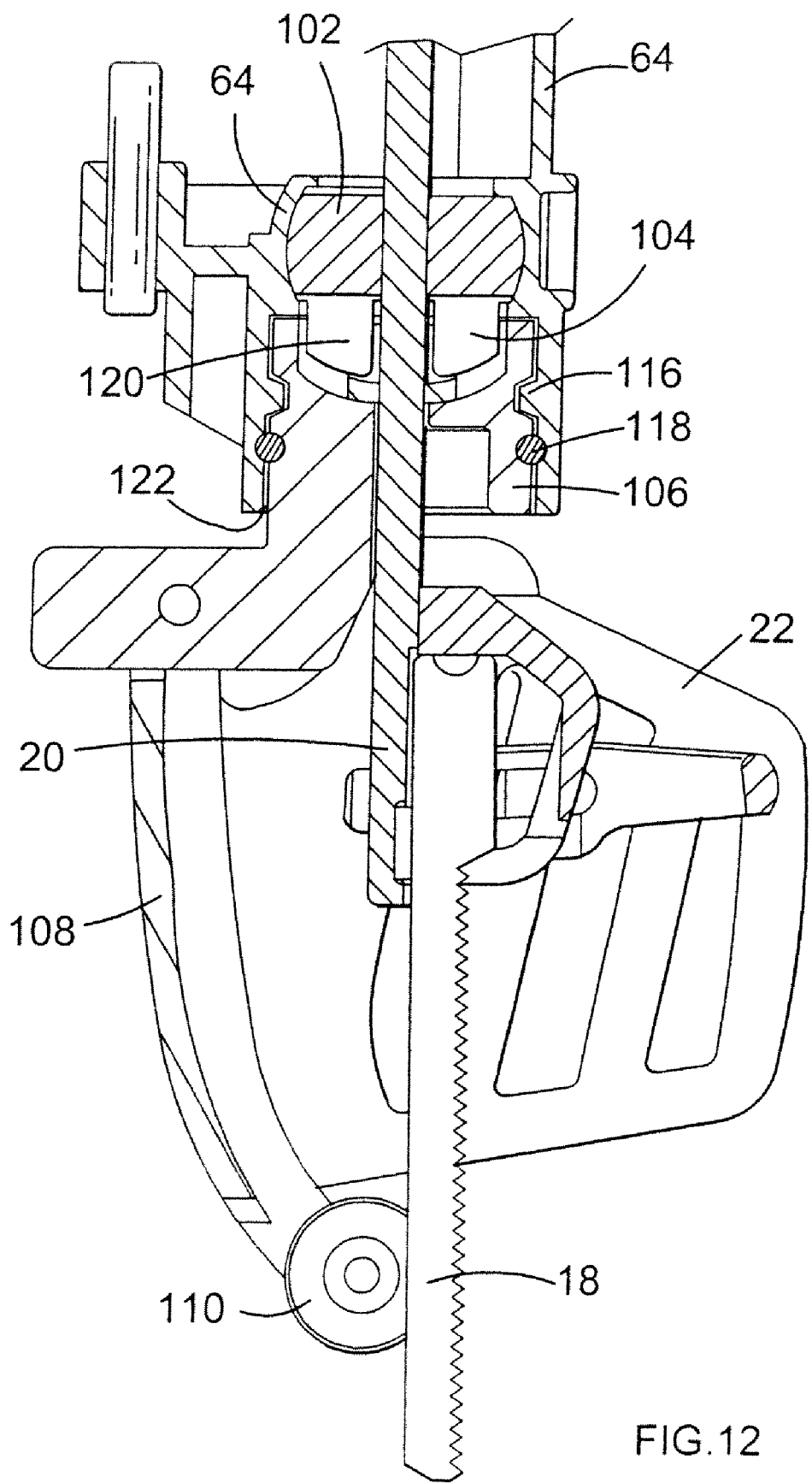
FIG. 12 is an enlarged view of the lower part of the blade support assembly of FIG. 10 when the blade is not cutting a workpiece.
Figure 13:
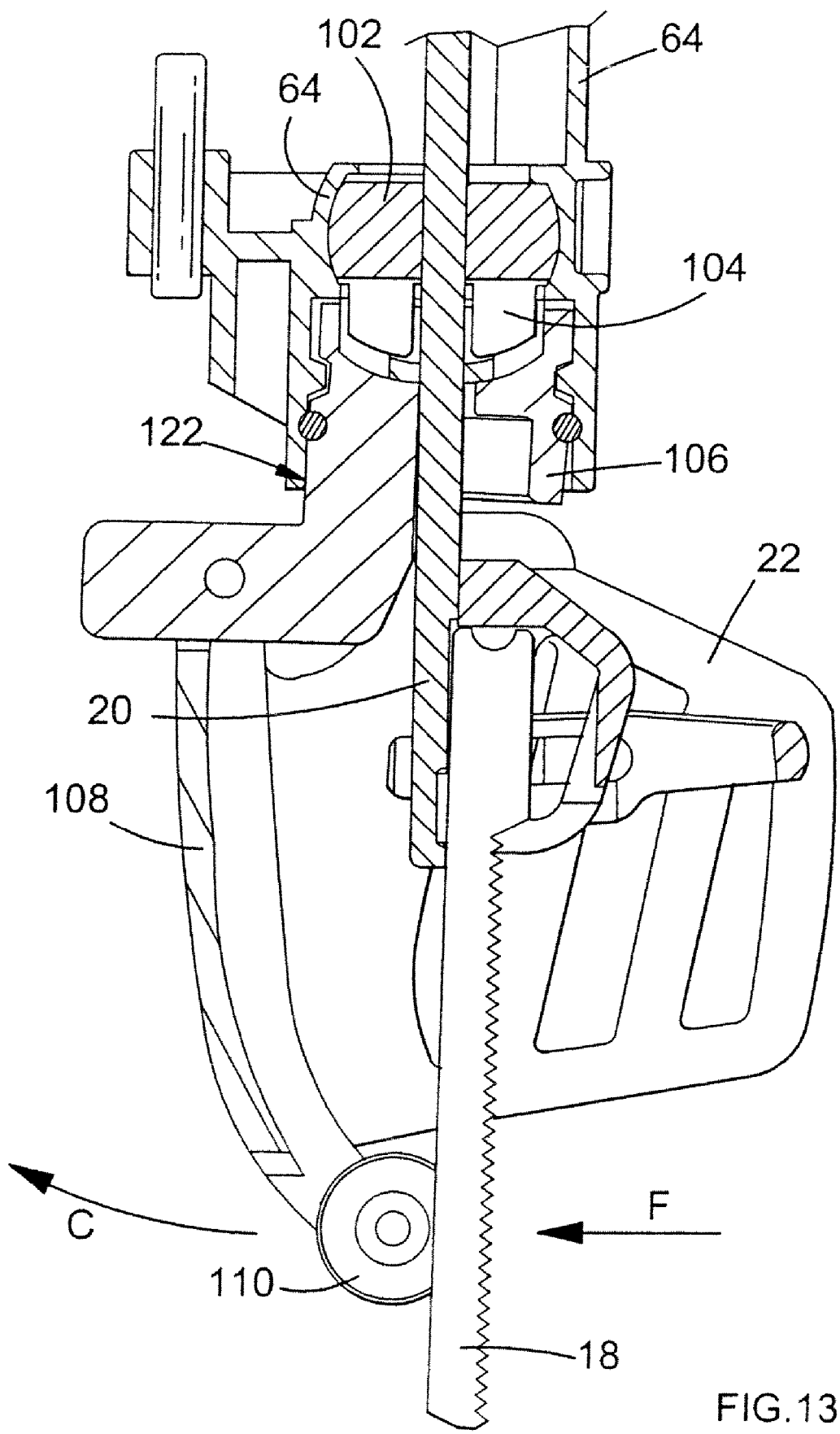
FIG. 13 is a view corresponding to FIG. 12 when the blade is cutting a workpiece.

Referring now in detail to FIGS. 12 and 13, when the jigsaw is used to cut a workpiece (not shown), the reaction force from the workpiece acting on the blade 18 tends to cause the blade 18 to pivot clockwise relative to the shaft 20 form the position shown in FIG. 12 to that shown in FIG. 13. As a result, a turning moment is applied via blade support roller 110 to the support arm 108 in the direction of arrow C shown in FIG. 13. This turning moment is opposed by an opposite turning moment applied to the control bearing 106 by the support housing 64 as the clearance 122 is reduced from the arrangement shown in FIG. 12c to that shown in FIG. 13.

However, as a result if the limited pivoting movement permitted between control bearing 106 and lower bearing 102, the turning moment applied by the support arm 108 to the support housing 64 is not transferred to the lower bearing 102, and is therefore not transferred to the shaft 20. The therefore provides the advantage that frictional forces between the lower bearing 102 and shaft 20 are not increased as a result if reaction force F (FIG. 13) acting on blade support roller 110.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A power tool that imparts a reciprocating motion on a cutting blade, the power tool comprising:
    a tool housing containing a motor having a motor shaft;
    a drive gear rotatably supported in said tool housing and engaged to said motor shaft;
    an annular cam surface that extends from a face of said drive gear;
    a blade support housing defining an aperture;
    an output shaft slidably received in said aperture and adapted to connect to the cutting blade, wherein said output shaft is connected to said drive gear and is operable to reciprocate along a cutting axis that is generally perpendicular to a cutting direction;
    trunnions that extend from said blade support housing and pivotally connect said blade support housing in said tool housing;
    a cam follower connected to said blade support housing and operable to engage said annular cam surface on said drive gear to impart a pendulum action on said blade support housing when said drive gear rotates relative to said cam follower;
    a scroll member connected to said blade support housing, wherein rotation of said scroll member rotates said output shaft about the cutting axis to change said cutting direction of the cutting blade;
    a mode selector member rotatably disposed in the housing; and
    a locking arm disposed on said blade support housing and connected to said mode selector member,
    wherein said mode selector member is moveable to position said locking arm between a first position, a second position and a third position,
    wherein said locking arm is positioned to permit rotation of said scroll member and prevent said cam follower from contacting said annular cam surface on said drive gear when said locking arm is in said first position,
    wherein said locking arm is positioned to inhibit rotation of said scroll member and prevent said cam follower from contacting said annular cam surface when said locking arm is in said second position and
    wherein said locking arm is positioned to inhibit rotation of said scroll member and permit said cam follower to contact said annular cam surface when said locking arm is in said third position.

2. The power tool of claim 1, wherein said locking arm engages a slot in said scroll member when said locking arm is in said second and third positions.

3. The power tool of claim 1, wherein said mode selector member includes a tooth member that extends from said mode selector member and engages a rounded groove formed in a lower end of said locking arm, wherein said tooth member remains in engagement with said rounded groove while said mode selector member moves said locking member between said first, second and third positions.

4. The power tool of claim 3, wherein said mode selector member includes a post having a groove recessed into a cylindrical outer periphery of said post, wherein said groove partially receives said rounded groove on the locking arm when said locking arm is in said third position.

5. The power tool of claim 3, wherein said mode selector member includes a post having a groove recessed into a cylindrical outer periphery of said post, wherein said groove is positioned to avoid receiving said rounded groove on the locking arm when said locking arm is in said first and second positions.

6. The power tool of claim 3, wherein said mode selector member includes a protrusion that can urge said blade support housing to a position that places said cam follower out of engagement with said annular cam surface when said locking arm is in said first and second positions and wherein said protrusion holds said blade support housing in a position that permits said cam follower to engage said annular cam surface when said locking arm is in said third position.

7. The power tool of claim 1, wherein said blade support housing pivots relative to said scroll member and wherein said scroll member generally remains stationary relative to said tool housing when said locking arm is in said third position.

8. A power tool comprising:
    a tool housing containing a motor;
    an output shaft connected to said motor and supported in said tool housing to pivot about a pivot axis, reciprocate along a cutting axis and rotate about said cutting axis, wherein said cutting axis is generally perpendicular to a cutting direction;
    an annular cam surface rotated by said motor that engages a cam follower connected to said output shaft to impart a pendulum action on said output shaft when said annular cam surface rotates relative to said cam follower;
    a mode selector member rotatably disposed in the housing; and
    a locking arm connected to said blade support housing and said mode selector member,
    wherein said mode selector member is moveable to position said locking arm between a first position, a second position and a third position,
    wherein said locking arm is positioned to permit rotation of said output shaft and prevent said cam follower from contacting said annular cam surface when said locking arm is in said first position,
    wherein said locking arm is positioned to inhibit rotation of said output shaft and prevent said cam follower from contacting said annular cam surface when said locking arm is in said second position and
    wherein said locking arm is positioned to inhibit rotation of said output shaft and permit said cam follower to contact said annular cam surface when said locking arm is in said third position.

9. The power tool of claim 8 further comprising a scroll member connected to said output shaft, wherein said scroll member rotates to change said cutting direction of the cutting blade.

10. The power tool of claim 9, wherein said locking arm engages a slot in said scroll member when said locking arm is in said second and third positions.

11. The power tool of claim 8, wherein said mode selector member includes a tooth member that extends from said mode selector member and engages a rounded groove formed in a lower end of said locking arm, wherein said tooth member remains in engagement with said rounded groove while said mode selector member moves said locking member between said first, second and third positions.

12. The power tool of claim 11, wherein said mode selector member includes a post having a groove recessed into a cylindrical outer periphery of said post, wherein said groove partially receives said rounded groove on the locking arm when said locking arm is in said third position.

13. The power tool of claim 11, wherein said mode selector member includes a post having a groove recessed into a cylindrical outer periphery of said post, wherein said groove is positioned to avoid receiving said rounded groove on the locking arm when said locking arm is in said first and second positions.

14. The power tool of claim 11, wherein said mode selector member includes a protrusion that can urge said output shaft to a position that places said cam follower out of engagement with said annular cam surface when said locking arm is in said first and second positions and wherein said protrusion permits said cam follower to engage said annular cam surface when said locking arm is in said third position.

* * * * *